United States Patent
Huang et al.

(10) Patent No.: US 8,190,929 B2
(45) Date of Patent: May 29, 2012

(54) COMPUTER SYSTEM

(75) Inventors: Li-Hong Huang, Shanghai (CN);
Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 483 days.

(21) Appl. No.: 12/401,108

(22) Filed: Mar. 10, 2009

(65) Prior Publication Data
US 2010/0131778 A1 May 27, 2010

(30) Foreign Application Priority Data
Nov. 27, 2008 (TW) .............................. 97146012 A

(51) Int. Cl.
*G06F 1/00* (2006.01)
(52) U.S. Cl. ......... 713/300; 710/301; 713/320; 713/324
(58) Field of Classification Search .......... 713/300–340; 710/301–306; 361/160
See application file for complete search history.

(56) References Cited

U.S. PATENT DOCUMENTS
7,774,633 B1 * 8/2010 Harrenstien et al. .......... 713/323
2009/0172444 A1 * 7/2009 Wang et al. .................. 713/323
* cited by examiner

*Primary Examiner* — Brian Misiura
*Assistant Examiner* — Kim Huynh
(74) *Attorney, Agent, or Firm* — J.C. Patents

(57) ABSTRACT

A computer system including a power supply and N main boards is provided, herein N is an integer greater than 1. The power supply generates a main power and a standby power. The N main boards respectively correspond to one standby voltage. The $1^{st}$ to the $(N-1)^{th}$ main boards respectively generate the corresponding standby voltage by the main power in a power-on state, and respectively generate the corresponding standby voltage by the standby power in a power-off state. The $N^{th}$ main board generates the corresponding standby voltage by the main power in the power-on and power-off state.

7 Claims, 4 Drawing Sheets

| identification code | main board 120 | main board 130 | main board 140 | main board 150 |
|---|---|---|---|---|
| | 00 | 01 | 10 | 11 |

FIG. 3

COMPUTER SYSTEM

CROSS-REFERENCE TO RELATED APPLICATION

This application claims the priority benefit of Taiwan application serial no. 97146012, filed Nov. 27, 2008. The entirety of the above-mentioned patent application is hereby incorporated by reference herein and made a part of specification.

BACKGROUND OF THE INVENTION

1. Field of the Invention

The present invention relates to a computer system. More particularly, the present invention relates to a computer system that can completely drive electronic elements needed to be driven in a main board in a power-off state.

2. Description of Related Art

With the technology development in recent years, a computer system has unavoidably become an indispensable information processing tool in modern human life. The computer system can satisfy all of people's needs in work, travel, and entertainment. For example, information such as personal financial statements, banking account passwords, confidential documents, photos, private letters, commercial documents and intellectual creations can all be stored by the computer system in a hard disc of the computer system.

The power efficiency of the computer system reduces when people are only temporarily away from the computer. Due to the above issue, the computer system is usually disposed with a corresponding power management mechanism to turn off some electronic elements in the computer system appropriately to achieve the goal of reducing power consumption. In the power management mechanism, a power supply inside the computer system provides two types of power: a main power and a standby power. Herein, the main power is only provided to the main board when the computer system is in a power-on state, and the standby power is provided to the main board when the main board is electrically connected to the power supply.

However, sometimes, the standby power provided by the power supply may not satisfy the demand of the main board so that the electronic elements driven by the standby power in the computer system can not function normally and thereby lower the operating function of the computer system. Although the operating function of the computer system can be acquired by replacing the power supply, disadvantages such as higher hardware cost and lower source utilization efficiency may result.

SUMMARY OF THE INVENTION

The present invention provides a computer system that can maintain required operating functions of the computer system without replacing a power supply.

A computer system including a power supply and N main boards is provided in the present invention, herein, N is an integer greater than 1. The power supply generates a main power and a standby power. The N main boards each corresponds to one standby voltage. Here, the $1^{st}$ to the $(N-1)^{th}$ main boards each generates the corresponding standby voltage by the main power in a power-on state and generates the corresponding standby voltage by the standby power in a power-off state. On the other hand, the $N^{th}$ main board generates the corresponding standby voltage by the main power in both the power-on and the power-off states.

In one embodiment of the present invention, the N main boards each includes a controller, a switch, and a first voltage converter. Herein, the controller receives a model identification code, and outputs a standby voltage startup signal and a power enable signal when the model identification code conforms to an identification code of the main board corresponding to the controller. Moreover, the power supply outputs the main power and a main voltage startup signal to the $N^{th}$ main board. In addition, the power supply outputs the main power and the main voltage startup signal to one or a lot of main boards among the $1^{st}$ to the $(N-1)^{th}$ main boards when the one or the lot of main boards of is/are in the power-on state.

Accordingly, the main power and the main voltage startup signal are then outputted to the main board corresponding to the controller. On the other hand, the switch receives the main power and the standby power and determines whether the main power or the standby power is outputted according to the standby voltage startup signal. Thus, the first voltage converter then converts the power from the switch to the corresponding standby voltage.

In light of the foregoing, a main board of the computer system in the present invention uses the main power of the computer system to generate the standby voltage of the main board whether the computer system is in the power-on state or the power-off state. Therefore, the electronic elements that need to be driven in the main board will then be driven completely and thereby allow the computer system to achieve required operating functions without replacing the power supply.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a table of identification codes of a particular main board and the main board.

DESCRIPTION OF EMBODIMENTS

Figure 1:
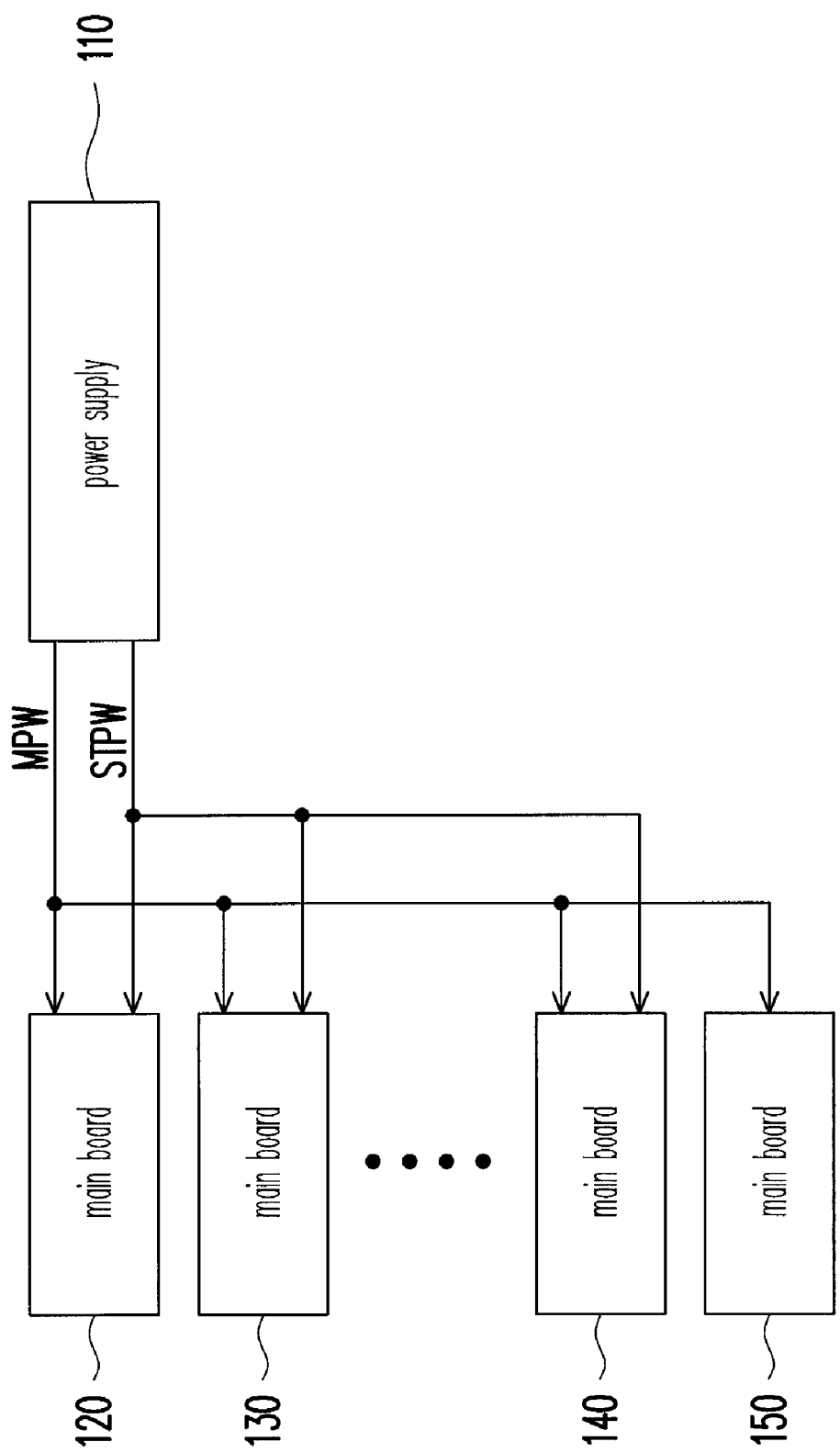
FIG. 1 is a schematic circuit block diagram of a computer system according to an embodiment of the present invention.

FIG. 1 is a schematic circuit block diagram of a computer system according to an embodiment of the present invention. Referring to FIG. 1, a computer system 100 includes a power supply 110 and a plurality of main boards 120-150. Here, the main boards 120-150 are all electrically connected to the power supply 110.

In the overall operation, the power supply 110 generates a main power MPW and a standby power STPW. On the other hand, the main board 120 generates a standby voltage of the main board 120 with the main power MPW in a power-on state, and generates the standby voltage of the main board 120 with the standby power STPW in a power-off state. Similarly, the main board 130 also generates a standby voltage of the main board 130 with the main power MPW in the power-on state, and generates the standby voltage of the main board 130 with the standby power STPW in the power-off state. The operating mechanism of the main board 140 is determined accordingly.

On the other hand, the main board 150 generates a standby voltage of the main board 150 with the main power MPW in the power-on state, and generates the standby voltage of the main board 150 also with the main power MPW in the power-off state. Thus, as the main board 150 uses the main power MPW to generate the standby voltage in the power-off state, electronic elements that need to be driven in the main board 150 will be completely driven in the power-off state. Conversely, whether the electronic elements that need to be driven in the main boards 120-140 in the power-off state are driven completely, the computer system 100 can maintain their basic operating functions through the main board 150. In other words, the computer system 100 may achieve the goal of maintaining the operating functions in the power-off state without replacing the power supply 110.

In order to make the present embodiment more comprehensible for those skilled in the art, how the main boards 120-150 generate the corresponding standby voltages with the power provided by the power supply 110 is further illustrated.

Figure 2:
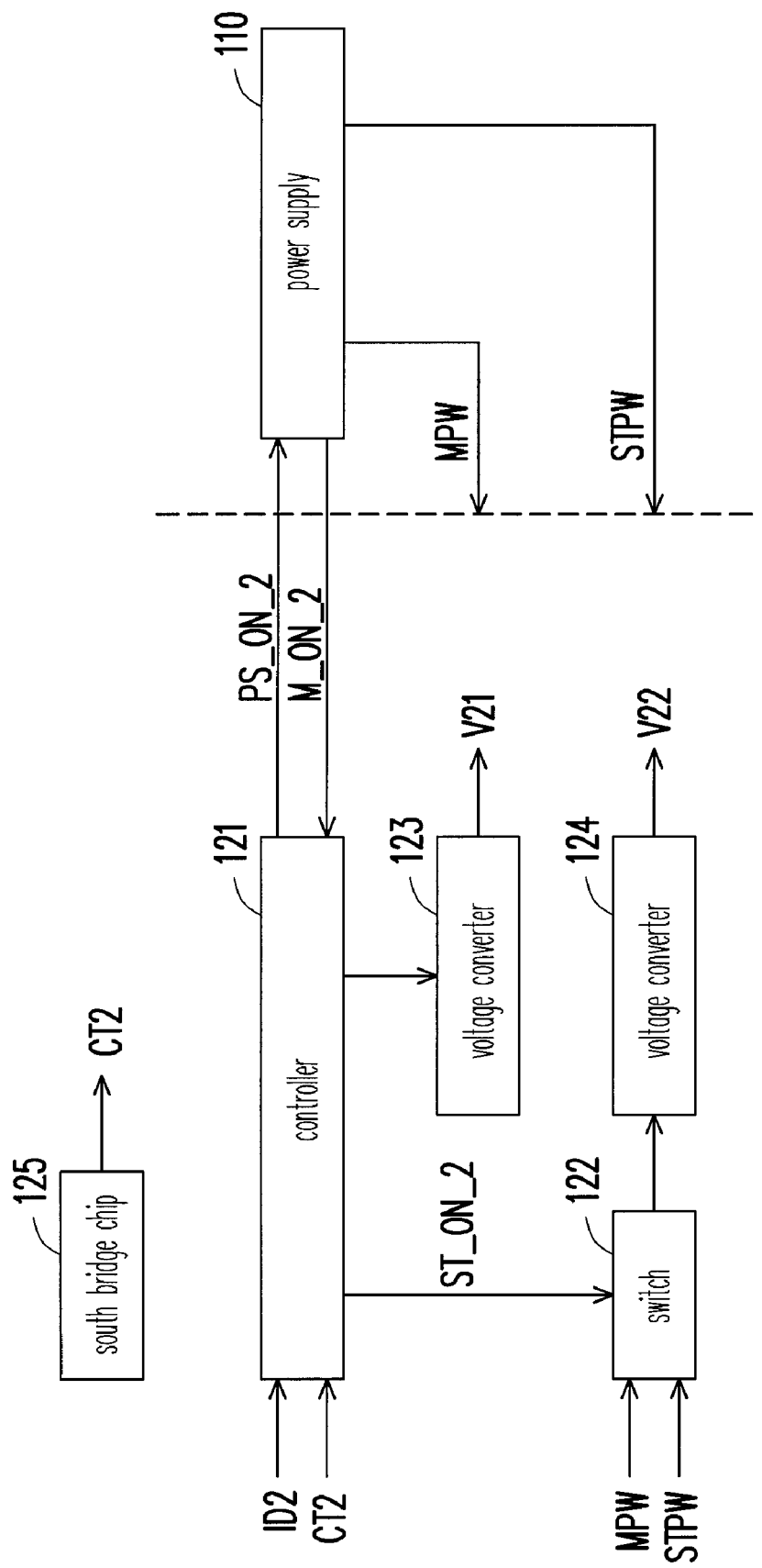
FIG. 2 is a schematic circuit block diagram of a main board driven by a power supply according to an embodiment of the present invention.

FIG. 2 is a schematic circuit block diagram of the main board driven by the power supply according to an embodiment of the present invention. Referring to FIG. 2, the main board 120 includes a controller 121, a switch 122, a voltage converter 123, and a voltage converter 124. The controller 121 is electrically connected to the power supply 110. The switch 122 is electrically connected to the power supply 110 and the controller 121. The voltage converter 123 is electrically connected to the controller 121, and the voltage converter 124 is electrically connected to the switch 122.

In the overall operation, the controller 121 receives a model identification code ID2. It should be noted that, as shown in FIG. 3, the main boards 120-150 each has an identification code. For example, an identification code of the main board 120 is {00}, an identification code of the main board 130 is {01}, an identification code of the main board 140 is {10}, and an identification code of the main board 150 is {11}. Hence, when the controller 121 receives the model identification code ID2, the controller 121 compares the model identification code ID2 with the identification code {00} of the main board 120 to determine whether a corresponding operation is to be performed.

When the model identification code ID2 conforms to the identification code {00} of the main board 120, the controller 121 then outputs a power enable signal PS_ON_2 to the power supply 110, and outputs a standby voltage startup signal ST_ON_2 to the switch 122. On the other hand, when the power of the main board 120 is on and the power supply 110 receives the power enable signal PS_ON_2, the power supply 110 then outputs the main power MPW to the main board 120.

It should be noted that the controller 121 switches the level of the standby voltage startup signal ST_ON_2 according to a voltage control signal CT2 in a power-on state. Therefore, the switch 122 outputs the main power MPW in the power-on state such that the voltage converter 124 converts the main power MPW from the switch 122 to a standby voltage V22 of the main board 120. Conversely, the switch 122 will output the standby power STPW in the power-off state so that the voltage converter 124 converts the standby power STPW to the standby voltage V22 of the main board 120. In other words, the main board 120 generates the standby voltage V22 with the main power MPW provided by the power supply 110 in the power-on state. On the contrary, the main board 120 generates the standby voltage V22 with the standby power STPW provided by the power supply 110 in the power-off state.

In the meanwhile, when the power supply 110 receives the power enable signal PS_ON_2, it also outputs a main voltage startup signal M_ON_2 to the controller 121. Here, the controller 121 shields the main voltage startup signal M_ON_2 in the power-off state such that the voltage converter 123 can not generate a main voltage V21. Contrarily, the controller 121 in the power-on state transmits the main voltage startup signal M_ON_2 to the voltage converter 123 according to the voltage control signal CT2. At this time, the voltage converter 123 generates the main voltage V21 according to the main voltage startup signal M_ON_2.

Notably, the main board 120 further includes a south bridge chip 125 in the embodiment of FIG. 2. Here, the south bridge chip 125 generates the voltage control signal CT2 received by the controller 121. Moreover, the controller 121 described in the present embodiment is, for example, a complex programmable logic device. In addition, the internal configurations and the operating mechanisms of the main boards 130 and 140 are all identical to that of the main board 120 and thus not repeated herein.

Figure 4:
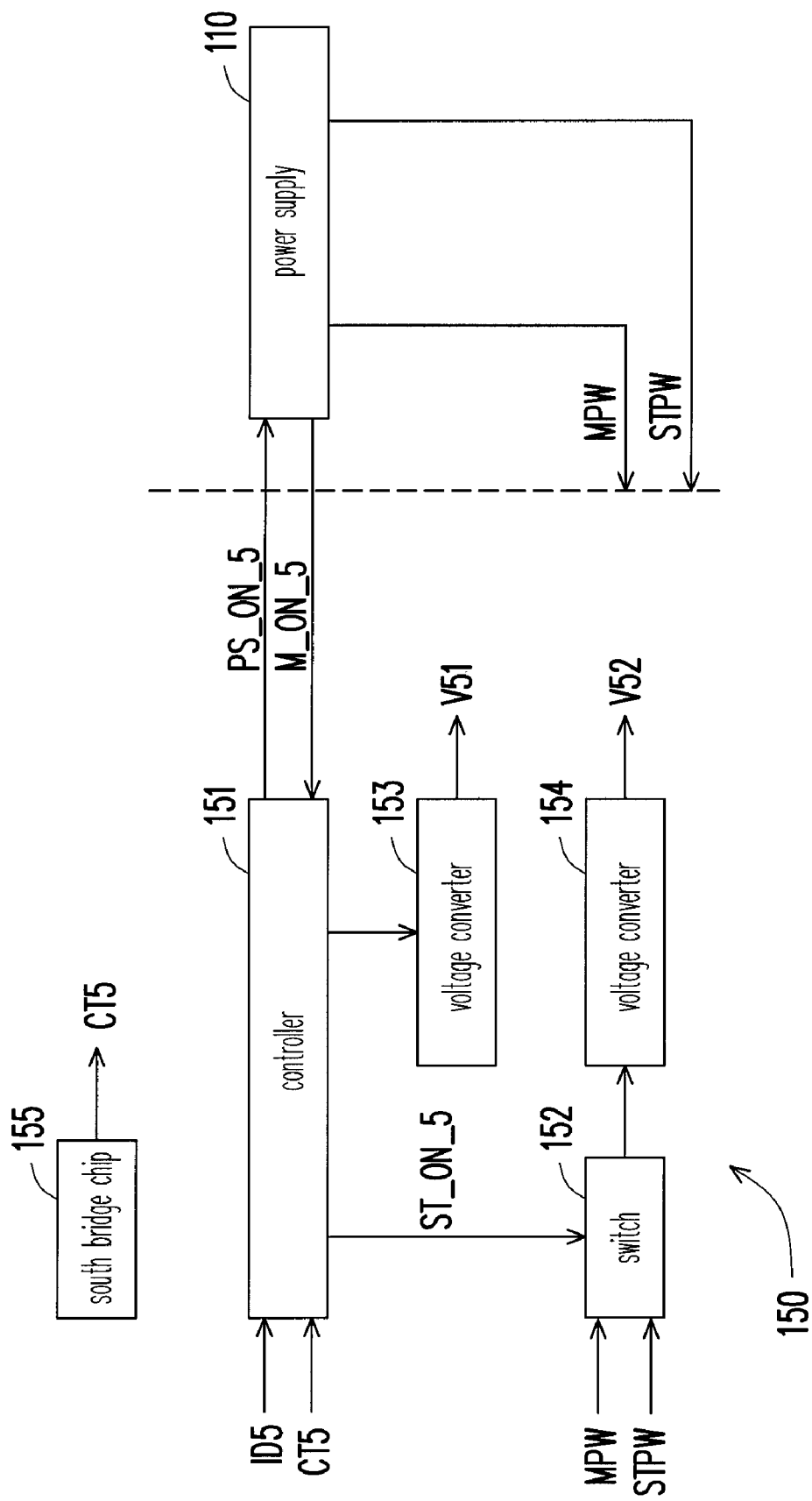
FIG. 4 is a schematic circuit block diagram of a main board driven by a power supply according to another embodiment of the present invention.

On the other hand, FIG. 4 shows a schematic circuit block diagram of a main board driven by a power supply according to another embodiment of the present invention. Referring to FIG. 4, the main board 150 includes a controller 151, a switch 152, a voltage converter 153, a voltage converter 154, and a south bridge chip 155. Here, the internal configuration of the main board 150 is substantially identical to the internal configurations of the main boards 120-140. Moreover, the operating mechanism of the main board 150 is also similar to the operating mechanisms of the main boards 120-140.

Herein, the controller 151 receives a model identification code ID5 and outputs a standby voltage startup signal ST_ON_5 and a power enable signal PS_ON_5 when the model identification code ID5 conforms to the identification code {11} of the main board 150 corresponding to the controller 151. Accordingly, the power supply 110 outputs a main power MPW and a main voltage startup signal M_ON_5 to the main board 150. The switch 152 receives the main power MPW and a standby power STPW, and determines the power outputted based on the standby voltage startup signal ST_ON_5. The voltage converter 154 then converts the power from the switch 152 to a standby voltage V52. The voltage converter 153 generates a main voltage V51 according to the main voltage startup signal M_ON_5. The south bridge 155 then generates a voltage control signal CT5 needed by the controller 151.

However, the difference in the operating mechanisms between the main board 150 and the main boards 120-140 is that the controller 151 does not switch the level of the standby voltage startup signal ST_ON_5 in the power-on state. Therefore, the switch 152 outputs the main power MPW in the power-on state such that the voltage converter 154 converts the main power MPW from the switch 152 to the standby voltage V52 of the main board 150. Similarly, the switch 152 also outputs the main power MPW in the power-off state so that the voltage converter 154 converts the main power MPW to the standby voltage V52 of the main board 150. The detailed operation of the embodiment in FIG. 4 is included in the embodiments aforementioned and thus not repeated herein.

In summary, the present invention applies a method of generating the standby voltage of the main board using the main power of the computer system to elevate the operating functions of the computer system when the main board is in the power-on and the power-off states. Therefore, to the main board that uses the main power to generate the standby voltage, the electronic elements needed to be driven in the main board will be completely driven in the power-off state and thereby allow the computer system to achieve the required operating functions without replacing the power supply.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A computer system, comprising:
    a power supply, used to generate a main power and a standby power; and
    N main boards, corresponded to one standby voltage respectively, wherein when all of the main boards are in a power-on state, each of the main boards generates the corresponding standby voltage with the main power, and when all of the main boards are in a power-off state, the $1^{st}$ to the $(N-1)^{th}$ main boards respectively generate the corresponding standby voltage with the standby power, and the $N^{th}$ main board generates the corresponding standby voltage with the main power to maintain a basic operation of the computer system, wherein N is an integer greater than 1.

2. The computer system of claim 1, wherein each of the main boards comprises:
    a controller, receiving a model identification code and outputting a standby voltage startup signal and a power enable signal when the model identification code conforms to an identification code of the main board corresponding to the controller, so that the power supply outputs the main power and a main voltage startup signal to the $N^{th}$ main board, and the power supply outputs the main power and the main voltage startup signal to one or a plurality of main boards among the $1^{st}$ to the $(N-1)^{st}$ main boards when the one or the plurality of main boards is/are in the power-on state;
    a switch, electrically connected to the controller to receive the main power and the standby power and outputting the main power or the standby power according to the standby voltage startup signal; and
    a first voltage converter, used to convert the power from the switch to the corresponding standby voltage.

3. The computer system of claim 2, wherein each of the plurality of main boards further comprises:
    a second voltage converter, generating a main voltage according to the main voltage startup signal, wherein the controller shields the main voltage startup signal in the power-off state and transmits the main voltage startup signal to the second voltage converter according to a voltage control signal in the power-on state.

4. The computer system of claim 3, wherein each of the plurality of main boards further comprises a south bridge chip so as to generate the voltage control signal.

5. The computer system of claim 3, wherein each of the plurality of controllers in the $1^{st}$ to the $(N-1)^{th}$ main boards switches a level of the standby voltage startup signal according to the voltage control signal in the power-on state, so that each of the plurality of switches in the $1^{st}$ to the $(N-1)^{th}$ main boards outputs the standby power in the power-off state and outputs the main power in the power-on state.

6. The computer system of claim 3, wherein the controller of the $N^{th}$ main board does not switch the level of the standby voltage startup signal in the power-on state, so that the switch of the $N^{th}$ main board outputs the main power in both the power-on state and the power-off state.

7. The computer system of claim 2, wherein the controller is a complex programmable logic device.

* * * * *